US010597334B2

(12) United States Patent
Watanabe et al.

(10) Patent No.: US 10,597,334 B2
(45) Date of Patent: Mar. 24, 2020

(54) TURBINE COMPRISING TURBINE STATOR VANES OF A CERAMIC MATRIX COMPOSITE ATTACHED TO A TURBINE CASE

(71) Applicant: IHI CORPORATION, Koto-ku (JP)

(72) Inventors: Fumiaki Watanabe, Koto-ku (JP); Hiroyuki Yagi, Koto-ku (JP)

(73) Assignee: IHI CORPORATION, Koto-ku (JP)

( * ) Notice: Subject to any disclaimer, the term of this patent is extended or adjusted under 35 U.S.C. 154(b) by 204 days.

(21) Appl. No.: 15/710,100

(22) Filed: Sep. 20, 2017

(65) Prior Publication Data

US 2018/0037511 A1 Feb. 8, 2018

Related U.S. Application Data

(63) Continuation of application No. PCT/JP2015/077963, filed on Oct. 1, 2015.

(30) Foreign Application Priority Data

Jun. 10, 2015 (JP) .................................. 2015-117440

(51) Int. Cl.
*F01D 9/02* (2006.01)
*C04B 35/80* (2006.01)
(Continued)

(52) U.S. Cl.
CPC ................ *C04B 35/80* (2013.01); *F01D 9/02* (2013.01); *F01D 9/041* (2013.01); *F01D 11/00* (2013.01);
(Continued)

(58) Field of Classification Search
CPC . F01D 9/02; F01D 9/041; F01D 11/00; F01D 11/001; F01D 25/00; F01D 25/046;
(Continued)

(56) References Cited

U.S. PATENT DOCUMENTS 5,154,577 A * 10/1992 Kellock ................ F01D 11/005
277/641
5,201,846 A * 4/1993 Sweeney ................... F01D 9/04
415/170.1
(Continued)

FOREIGN PATENT DOCUMENTS

CN 103814193 A 5/2014
EP 2 570 602 A2 3/2013
(Continued)

OTHER PUBLICATIONS

International Search Report dated Jan. 12, 2016 in PCT/JP2015/077963, filed on Oct. 1, 2015 ( with English Translation).

*Primary Examiner* — Aaron R Eastman

(74) *Attorney, Agent, or Firm* — Oblon, McClelland, Maier & Neustadt, L.L.P.

(57) ABSTRACT

A turbine is provided which is simple in structure and which allows a gas now passage to be formed using a CMC over a wide range while suppressing thermal stress on turbine stator vanes, thereby achieving further improved jet engine performance and reduced fuel consumption. The turbine includes a turbine stator vane formed of a CMC and including an outer band portion and an inner band portion extending continuously from an airfoil portion is hooked to a hanger made of a metal material with a front portion and a rear portion of the outer band portion engaged with a front hook portion and a rear hook portion of the hanger, respectively, and the hanger in turn is attached to a turbine case made of a metal material.

5 Claims, 7 Drawing Sheets

(51) Int. Cl.
  *F01D 25/00* (2006.01)
  *F02C 7/00* (2006.01)
  *F01D 11/00* (2006.01)
  *F01D 9/04* (2006.01)
  *F01D 25/24* (2006.01)
  *F02C 7/28* (2006.01)

(52) U.S. Cl.
  CPC ............ *F01D 11/001* (2013.01); *F01D 25/00* (2013.01); *F01D 25/005* (2013.01); *F01D 25/246* (2013.01); *F02C 7/00* (2013.01); *F02C 7/28* (2013.01); *F01D 11/005* (2013.01); *F05D 2300/6033* (2013.01); *Y02T 50/672* (2013.01)

(58) Field of Classification Search
  CPC .. F01D 11/005; F02C 7/00; F02C 7/28; F05D 2300/6033
  USPC .......................................................... 415/200
  See application file for complete search history.

(56) References Cited

U.S. PATENT DOCUMENTS

| | | | |
|---|---|---|---|
| 5,226,789 A * | 7/1993 | Donges .................. | F01D 9/042 415/173.4 |
| 5,492,445 A | 2/1996 | Shaffer et al. | |
| 6,758,653 B2 | 7/2004 | Morrison | |
| 8,152,451 B2 * | 4/2012 | Manteiga .................. | F01D 9/02 415/115 |
| 2003/0000223 A1 | 1/2003 | Conete et al. | |
| 2005/0129499 A1 | 6/2005 | Morris et al. | |
| 2006/0010879 A1 | 1/2006 | Aumont et al. | |
| 2008/0152488 A1 * | 6/2008 | Kammel ................. | F01D 5/147 415/209.4 |
| 2010/0196155 A1 | 8/2010 | Twell | |
| 2010/0319352 A1 * | 12/2010 | Hernandez Russe ... | F01D 9/041 60/772 |
| 2012/0027572 A1 | 2/2012 | Denece et al. | |
| 2012/0237342 A1 * | 9/2012 | Berche .................. | F01D 11/005 415/174.1 |
| 2014/0001285 A1 | 1/2014 | Grooms, III et al. | |
| 2014/0004293 A1 * | 1/2014 | Grooms, II ............. | F04D 29/60 428/99 |
| 2014/0147264 A1 * | 5/2014 | Belmonte ............... | F01D 9/042 415/208.2 |
| 2014/0227088 A1 | 8/2014 | Beaujard et al. | |
| 2014/0314556 A1 * | 10/2014 | Fremont ................. | F01D 5/284 415/200 |
| 2015/0226075 A1 | 8/2015 | Aoki et al. | |
| 2015/0361893 A1 * | 12/2015 | Klingels ................. | F01D 25/26 415/213.1 |
| 2018/0355740 A1 * | 12/2018 | Usseglio ................ | F01D 9/042 |

FOREIGN PATENT DOCUMENTS

| | | |
|---|---|---|
| FR | 2 979 661 A1 | 3/2013 |
| JP | 2004-76601 | 3/2004 |
| JP | 2005-83388 A | 3/2005 |
| JP | 2007-85342 | 4/2007 |
| JP | 2012-519803 | 8/2012 |
| JP | 2014-88786 | 5/2014 |
| JP | 2014-177888 A | 9/2014 |
| RU | 2 392 447 C2 | 6/2010 |
| WO | WO 2010/103213 A1 | 9/2010 |
| WO | WO 2014/003956 A1 | 1/2014 |

* cited by examiner

TURBINE COMPRISING TURBINE STATOR VANES OF A CERAMIC MATRIX COMPOSITE ATTACHED TO A TURBINE CASE

TECHNICAL FIELD

The present disclosure relates to a turbine comprising turbine stator vanes of a ceramic matrix composite attached to a turbine case.

BACKGROUND ART

In a jet engine for an airplane, for example, a turbine is exposed to high-temperature high-pressure gases from a combustion chamber. Thus, for turbine components such as turbine stator vanes, castings of nickel (Ni) alloy (metal material) with high heat resistance are used, typically.

In recent years, for the turbine components, use of ceramic matrix composites (hereinafter referred to as "CMCs") which are higher in heat resistance and smaller in weight than metal materials is being considered.

For example, Patent Document 1 shows a turbine in which airfoils of a CMC are attached to radially inner and outer platforms of a metal which form a gas flow passage.

RELATED ART DOCUMENT

Patent Document
  Patent Document 1: Japanese Unexamined Patent Application Publication No. 2007-85342

SUMMARY OF THE DISCLOSURE

Problems to be Solved by the Disclosure

In Patent Document 1, the platforms forming the gas flow passage are made of a metal material. In order to further improve jet engine performance and reduce fuel consumption, however, it is desirable that the turbine be formed using a CMC over a wide range including the platforms.

However, CMCs, which are commonly manufactured by bending a woven fabric of ceramic fiber into a desired shape and infiltrating a ceramic matrix into the shaped woven fabric, have limitations with respect to shape. For example, it is difficult to form complex shapes, such as shapes including branching, using CMCs, and even if it is possible, it may entail lowered strength and increased work and cost.

Further, with regard to turbine components attached to a turbine case, if conventional metallic ones are simply replaced with CMC ones, a great difference in linear thermal expansion coefficient between metals and CMCs leads to a problem that the turbine components with a small linear thermal expansion coefficient experience great thermal stress.

The present disclosure has been made in order to solve problems as mentioned above. An object of the present disclosure is to provide a turbine which is simple in structure and which allows a gas flow passage to be formed using a CMC over the widest possible range while suppressing thermal stress on turbine stator vanes that are turbine components, thereby achieving further improved jet engine performance and reduced fuel consumption.

Means for Solving the Problems

In order to achieve the above object, a turbine according to an embodiment of the present disclosure is a turbine for use in a jet engine and comprises a plurality of turbine stator vanes arranged about an axis of the jet engine to form a turbine nozzle, the turbine stator vanes being made of a ceramic matrix composite and each comprising an airfoil portion extending radially with reference to the axis of the jet engine, an outer band portion extending continuously from a radially outer end of the airfoil portion circumferentially to one side with reference to the axis of the jet engine, and an inner band portion extending continuously from a radially inner end of the airfoil portion circumferentially to the same side; a support member made of a metal material and comprising a front hook portion to engage with a front portion of the outer band portion located on a gas upstream side and a rear hook portion to engage with a rear portion of the outer band portion located on a gas downstream side; and a turbine case made of a metal material to which the support member is attached.

Effects of the Disclosure

In the embodiment of the present disclosure using the aforementioned means, turbine stator vanes made of a CMC and comprising an outer band portion and an inner band portion extending continuously from an airfoil portion are hooked to a support member made of a metal material, which in turn is attached to a turbine case made of a metal. This allows the turbine to be simple in structure and have a gas flow passage formed using a CMC over the widest possible range while suppressing thermal stress on the turbine stator vanes, thereby achieving further improved jet engine performance and reduced fuel consumption.

MODE OF CARRYING OUT THE DISCLOSURE

With reference to the accompanying drawings, an embodiment of the present disclosure will be described below.

FIGS. 1 to 6B show a turbine in an embodiment of the present disclosure. In the present embodiment, a low-pressure turbine constituting a jet engine is taken as an example. In the following description, "front" and "rear" refer to a gas upstream side and a gas downstream side viewed along the axis of the jet engine, "circumferential" refers to a circular direction about the axis, "radial" refers to a direction perpendicular to the axis, "inner" refers to a side radially nearer to the axis and "outer" refers to a side radially farther away from the axis.

Figure 1:
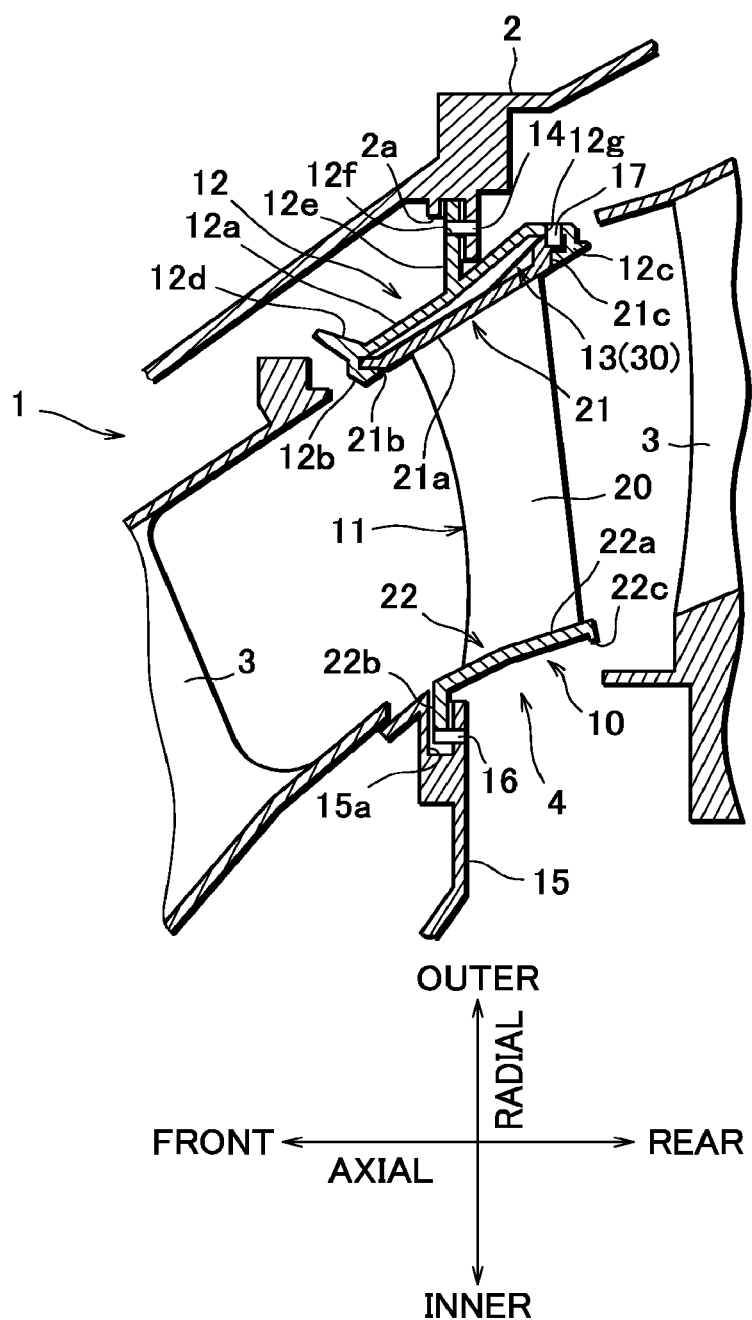
FIG. 1 is a partial cross-sectional view showing part of a turbine according to an embodiment of the present disclosure.

As shown in FIG. 1, a low-pressure turbine 1 constituting a jet engine comprises a turbine case 2 made of a metal material (nickel alloy, for example). Within the turbine case 2, turbine discs (not shown) rotating about the engine axis and forming multiple stages along the engine axis (in the horizontal direction in FIG. 1) are arranged at appropriate intervals. The turbine discs each have a plurality of turbine blades 3 on the circumference.

The turbine discs are connected to each other to rotate integrally, and connected integrally to a compressor rotor of a low-pressure compressor and a fan rotor of a fan, not shown, arranged in the front of the jet engine. Thus, in the low-pressure turbine 1, high-temperature gas from a combustor, not shown, expands and thereby rotates the turbine discs, and the power thus extracted by the turbine rotates the multistage low-pressure compressor rotor and the fan rotor integrally.

Within the turbine case 2, turbine nozzles 4 forming multiple stages (only a single stage is shown in FIG. 1) along the engine axis are further provided at appropriate intervals to alternate with the turbine discs.

Figure 2:
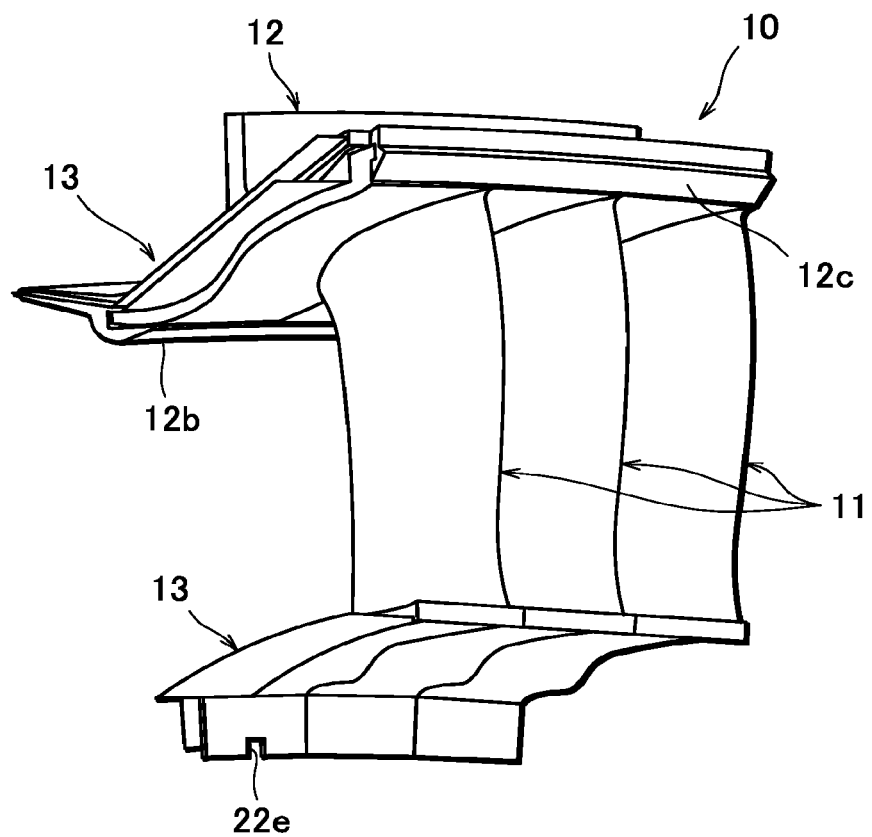
FIG. 2 is a perspective view of a turbine nozzle segment.
Figure 2:
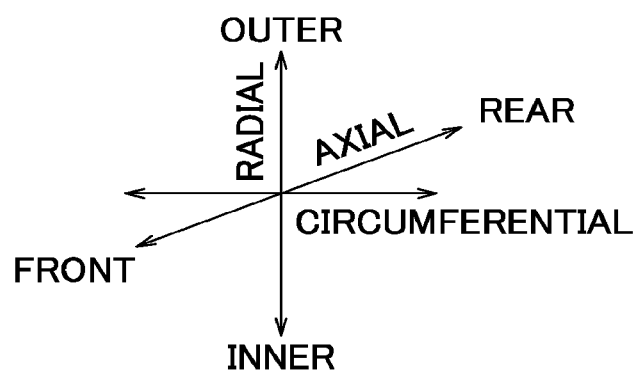

The turbine nozzle 4 is composed of a plurality of turbine nozzle segments (hereinafter referred to as "segments") 10. As shown in FIG. 2, the segment 10 comprises, as major components, a plurality of (three in the present embodiment) turbine stator vanes 11, a hanger (support member) and a plurality of seal members 13.

Specifically, the turbine stator vane 11 is made of a ceramic matrix composite (hereinafter referred to as "CMC"). For the CMC, for example silicon carbide fiber, carbon fiber, silicon nitride fiber, alumina fiber or boron nitride fiber is used as reinforcement fiber. Fiber of another appropriate ceramic material may be used. A mixture of two or more of the above-mentioned fibers may be used.

To form the turbine stator vane 11, preferably a three-dimensional woven fabric of reinforcement fiber is used depending on a thickness required to ensure sufficient strength. Alternatively, a stack of two-dimensional fabrics or a stack of two-dimensional fabrics sewn up with reinforcement fibers may be used. Orientation of fabric(s) is selected considering the direction of stress exerted on the turbine stator vane 11.

The turbine stator vane 11 is made by preforming a piece of woven fabric of reinforcement fiber, then infiltrating a ceramic matrix into the preformed woven fabric by a procedure such as impregnation, sintering or the like, and then machining the ceramic matrix-infiltrated woven fabric.

Figure 3:
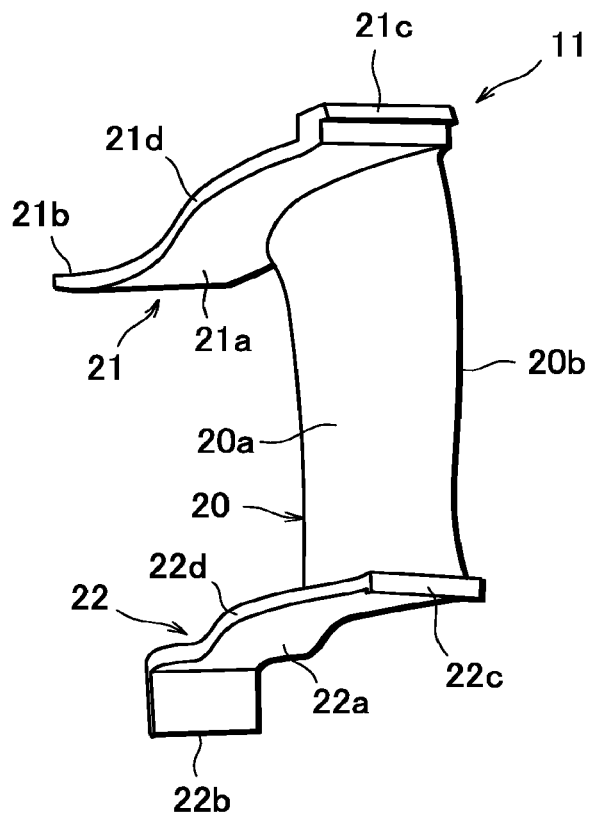
FIG. 3 is a perspective view of a single turbine stator vane.
Figure 3:
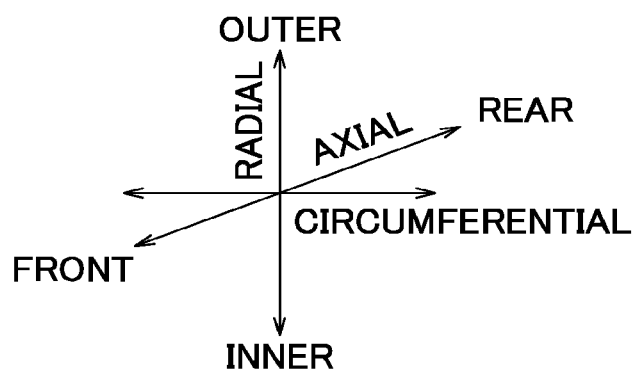

As shown in FIG. 3, a single turbine stator vane 11 forms a C-like shape as a whole. Specifically, the turbine stator vane 11 includes a radially-extending airfoil portion 20, an outer band portion 21 extending from a radially outer end of the airfoil portion 20 circumferentially to one side, thus projecting on a side 20a of the airfoil portion 20, and an inner band portion 22 extending from a radially inner end of the airfoil portion 20 circumferentially to the same side, thus projecting on the side 20a of the airfoil portion 20.

The outer band portion 21 includes a front portion 21b slanting radially outward from a base portion 21a which defines a gas flow passage. The outer band portion 21 also includes a rear portion 21c slanting radially outward from the base portion 21a and then projecting toward the axis, thus presenting an approximately S-shaped profile.

The inner band portion 22 includes a front portion 22b extending radially inward from a base portion 22a which defines the gas flow passage, and a rear portion 22c slightly projecting radially inward.

The end faces 21d, 22d at a circumferential end of the outer and inner band portion 21, 22 are curved in conformity with the side 20b of the airfoil portion 20. When a plurality of turbine stator vanes 11 are assembled into a segment 10 as shown in FIG. 2, this allows the outer band portions 21 to come into close contact with each other and the inner band portions 22 to come into close contact with each other. The contact faces of the outer band portions 21 as well as the contact faces of the inner band portions 22 are brazed together.

Figure 4:
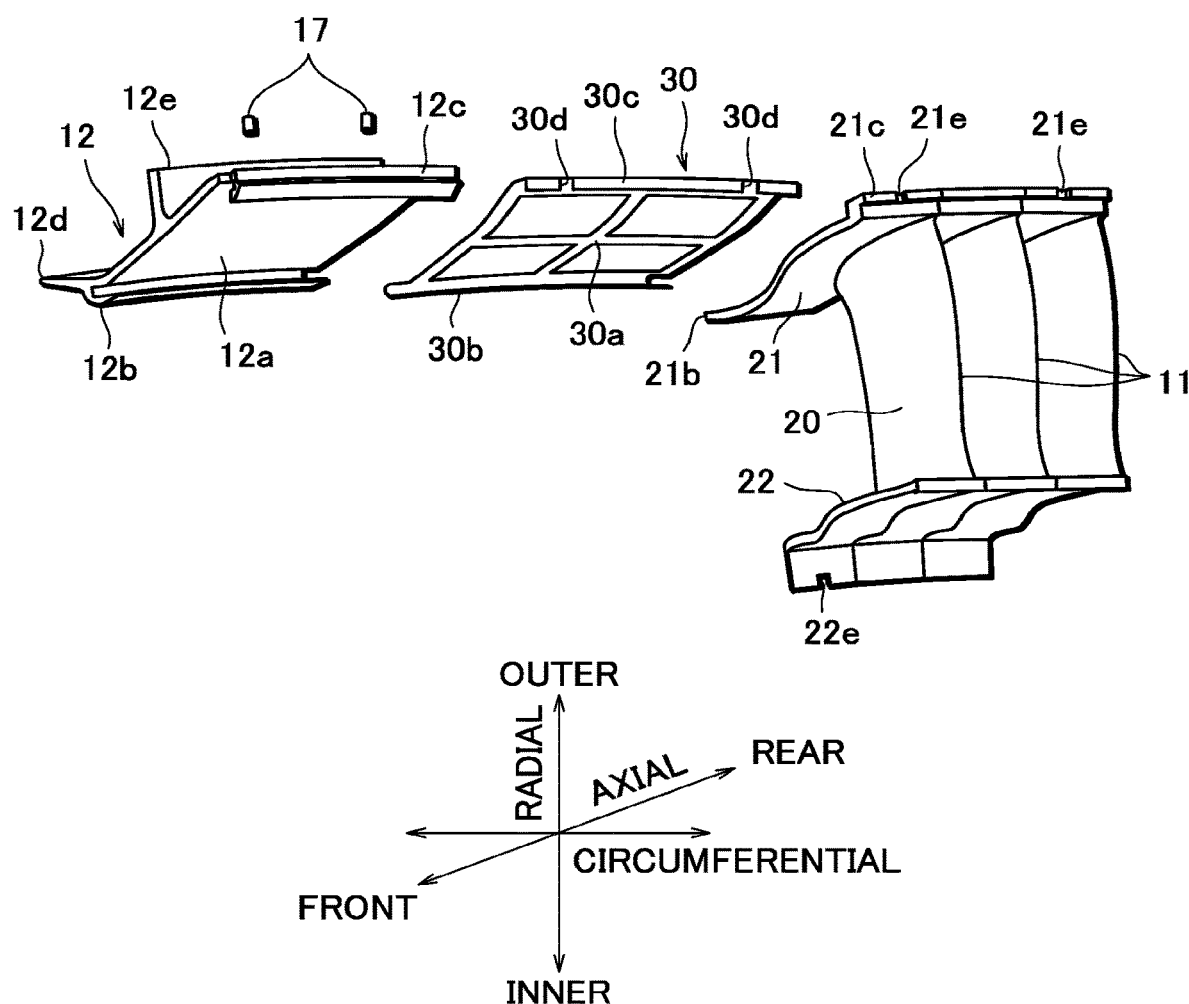
FIG. 4 is a perspective view showing the segment broken down into a plurality of turbine stator vanes, a hanger and a hanger seal.

The hanger 12 is made of a metal material (nickel alloy, for example) and, as shown in FIGS. 1, 2 and 4, arranged to the radially outer side of the segment 10 to be attached to the turbine case 2 while holding the segment 10. Specifically, the hanger 12 includes a base portion 12a to cover the outer peripheral surface of the segment 10 with a space between. At the front edge of the base portion 12a, a front hook portion 12b is provided to engage with the front portion 21b of the outer band portion 21 of each turbine stator vane 11, and at the rear edge of the base portion 12a, a rear hook portion 12c is provided to engage with the rear portion 21c of the outer band portion 21 of each turbine stator vane 11.

The hook portions 12b, 12c each have a groove on their inner side which is open to the axial center of the hanger. This enables the outer band portion 21 to be engaged with the hook portions by circumferentially sliding the front portion 21b and the rear portion 21c of the outer band portion 21 into the grooves in the front hook portion 12b and the rear hook portion 12c, respectively.

The hanger 12 further includes a front rim 12d and a rear rim 12e on the outer side, the front rim 12d extending from the front hook portion 12d diagonally forward, and the rear rim 12d being located at the axial center of the hanger to extend radially outward. The rear rim 12e has a plurality of through holes 12f (see FIGS. 1 and 6A).

The hanger 12 having the above-described structure is attached to the turbine case 2 by engaging a distal end of the rear rim 12e with a fitting portion 2a of the turbine case 2 and joining the fitting portion 2a and the rear rim together by pins 14 inserted into the through holes 12f. Accordingly, axial movement of the hanger 12 is restricted by the fitting portion 2a, and circumferential and radial movements thereof are restricted by the pins 14.

As shown in FIG. 2, for example, on the radially inner side of the segment 10, one of the turbine stator vanes 11 constituting the segment (leftmost turbine stator vane in FIG. 2) has a cutout 22e at the end of the front portion 22b of the inner band portion 22. As shown in FIG. 1, the segment 10 is attached to an axis-side support portion 15 by engaging the front portions 22b of the inner band portions 22 of the turbine stator vanes 11 with a fitting portion 15a of the axis-side support portion 15 and joining the fitting portion 15a and the front portions 22b together by a pin 16 inserted into the cutout 22e. Accordingly, axial movement of the inner band portions 22 is restricted by the fitting portion 15a, and circumferential movement thereof is restricted by the pin 16.

In the present embodiment, seal members 13 comprise a hook seal 30, hanger seals 31, outer seals 32 and inner seals 33.

As shown in FIG. 1, the hook seal 30 is interposed between the outer band portions 21 of the turbine stator vanes 11 and the hanger 12 to create a seal between the front portions 21b of the outer band portions 21 and the front hook portion 12b of the hanger 12 and between the rear portions 21c of the outer band portions 21 and the rear hook portion 12c of the hanger 12.

Specifically, as shown in FIG. 4, the hook seal 30 comprises a base portion 30a of a grid structure comprising four sides and a cross. A front side 30b and a rear side 30c are bent in conformity with the grooves in the front hook portion 12b and the rear hook portion 12c, respectively.

The hook seal 30 has two cutouts 30d in the rear side 30c. The hanger 12 has through holes 12g in the upper portion of the rear hook portion 12c to correspond to the cutouts 30d (see FIGS. 1 and 6A), and some of the turbine stator vanes 11 (turbine stator vanes 11 at the opposite ends in FIG. 4) have a cutout 21e in the rear portion 21c of the outer band portion 21. In the segment 10, circumferential movement of the hook seal 30 and the turbine stator vanes 11 relative to the hanger 12 is restricted by pins 17 each inserted into the through hole 12g and cutouts 30d, 21e.

Dimensions, such as a clearance between the front portions 21b of the outer band portions 21 and the front hook portion 12b of the hanger 12, a clearance between the rear portions 21c of the outer band portions 21 and the rear hook portion 12c of the hanger 12, and a thickness of the hook seal 30, are determined in consideration of the difference in thermal expansion between the turbine stator vanes 11 made of a CMC and the hanger 12 made of a metal material to suppress thermal stress exerted on the turbine stator vanes 11 at high temperature during operation of the jet engine and prevent gas leakage.

Figure 5:
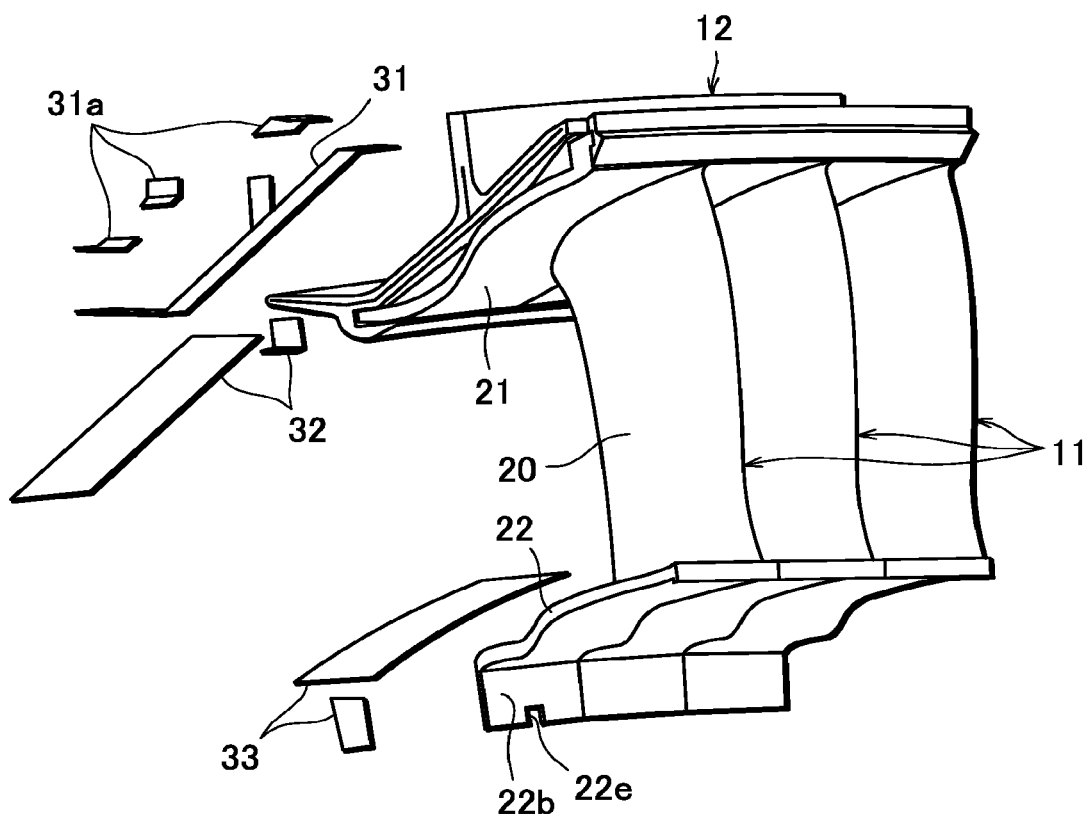
FIG. 5 is a perspective view showing seal members separated from the segment.
Figure 5:
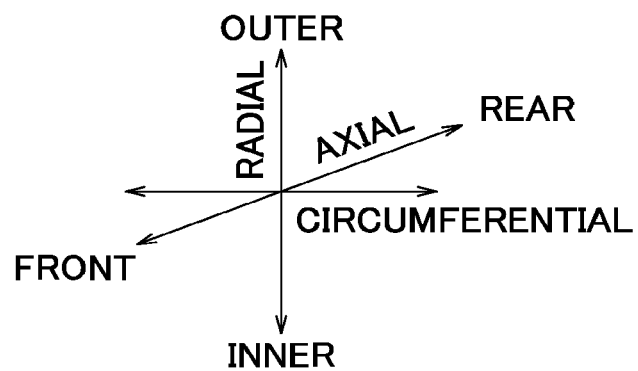
Figure 6A:
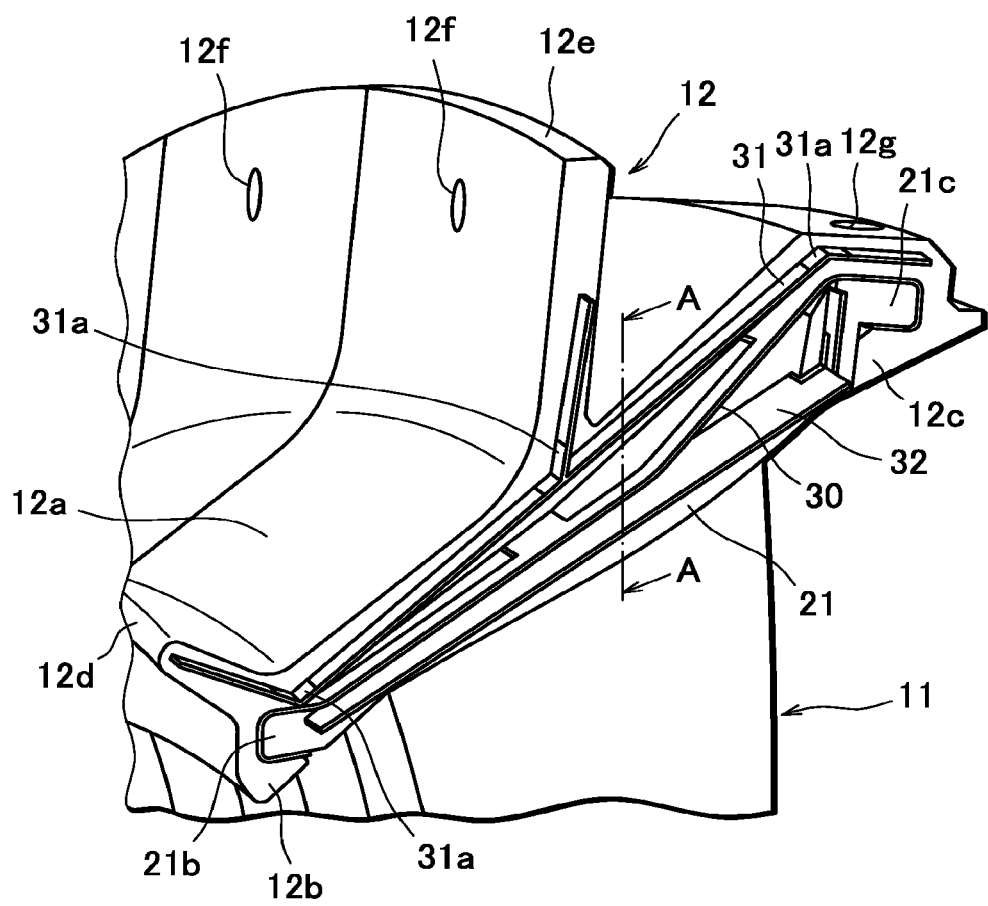
FIG. 6A is a perspective view showing an end face of an outer band portion of the segment.
Figure 6B:
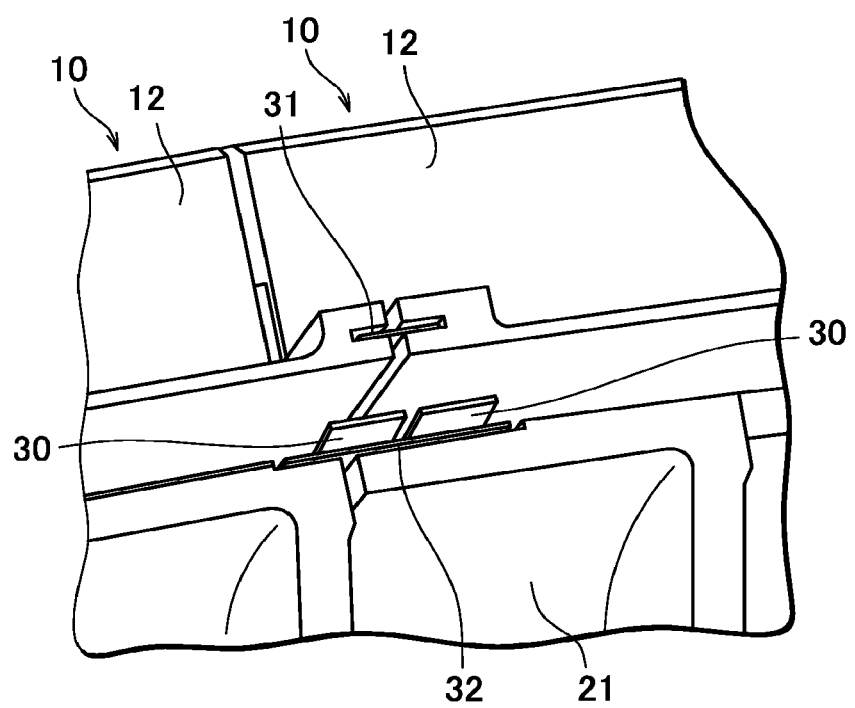
FIG. 6B shows a cross section along line A-A in FIG. 6A.

Hanger seals 31, outer seals 32 and inner seals 33 are provided to create a seal between the adjacent segments 10. Specifically, as shown in FIGS. 5, 6A and 6B, a hanger seal 31 is arranged in a seal groove in an end face at a circumferential end of the hanger 12. Auxiliary hanger seals 31a are arranged at bends of the hanger seal 31, respectively.

The outer seals 32 are arranged between the base portion 30a of the hook seal 30 and a radially outer surface of the outer band portion 21 and in a seal groove in an end face at a circumferential end of the rear portion 21c of the outer band portion 21. The inner seals 33 are arranged on a radially inner surface of the inner band portion 22 and in a groove in an end face at a circumferential end of the front portion 22b of the inner band portion 22.

As described above, in the turbine in the present embodiment, the turbine stator vane 11 is a continuous C-like shape as a whole, including the outer and inner band portions 21, 22 which define a gas flow passage. The turbine stator vane has thus a simple structure that can be formed from a single piece of woven fabric, while allowing a gas flow passage to be formed using a CMC for the most part.

The turbine stator vanes 11 are held by the hanger 12 with the front portions 21b and the rear portions 21c of the outer band portions 21 engaged with the front hook portion 12b and the rear hook portion 12c of the hanger 12, respectively, and attached to the turbine case 2 by means of the hanger 12. Since the hanger 12 as well as the turbine case 2 is made of a metal material, they do not experience a problem related to thermal stress. Thus, to the turbine case 2 originally designed for metallic turbine stator vanes to be attached, the segment 10 formed mostly of a CMC can be attached using a hanger 12 arranged to have the same fitting structure as the metallic turbine stator vanes have, without altering the fitting structure of the turbine case 2. Further, by determining the clearance between the hook portions 12b, 12c of the hanger 12 and the front and rear portions 21b, 21c of the outer band portions 21 appropriately, thermal stress on the turbine stator vanes 11 can be suppressed without constraining the turbine stator vanes 11 excessively.

Further, the hook seal 30 provided between the hook portions 12b, 12c of the hanger 12 and the front and rear portions 21b, 21c of the outer band portions 21, and the hanger seals 31, the outer seals 32 and the inner seals 33 provided between the adjacent segments 10 can prevent gas leakage from the gas flow passage.

Furthermore, the hook portions 12b, 12c of the hanger 12 are provided as grooved portions, which enables the outer band portion 21 to be engaged with the hook portions 12b, 12c by sliding the front and rear portions 21b, 21c of the outer band portion 21 circumferentially into them. The turbine stator vanes 11 can thus be attached reliably by easy work.

As described above, the turbine in the present embodiment can be simple in structure and allows a gas flow passage to be formed using a CMC over a wide range while suppressing thermal stress on the turbine stator vanes. It can therefore achieve further improved jet engine performance and reduced fuel consumption.

In the above, the turbine according to the present disclosure has been described. The present disclosure is however not limited to the described embodiment.

For example, in the described embodiment, the turbine is a low-pressure turbine provided in a jet engine. The present disclosure is however applicable to other types of jet-engine turbines having turbine stator vanes.

Further, in the described embodiment, the hanger 12 is attached to the turbine case 2 by engaging the rear rim 12e with the fitting portion 2a of the turbine case 2 and inserting the pins 14 into the through holes 12f. The structure for attaching the hanger 12 to the turbine case 2 is however not limited to this type.

Furthermore, in the present embodiment, the hook seal 30, the hanger seals 31, the outer seal 32 and the inner seals 33 are provided as seal members 13. The type, the number, the arrangement, etc. of seal members are however not limited to those in the described embodiment.

(Aspects of the Present Disclosure) A turbine according to a first aspect of the present disclosure is a turbine for use in a jet engine and comprises a plurality of turbine stator vanes arranged about an axis of the jet engine to form a turbine nozzle, the turbine stator vanes being made of a ceramic matrix composite and each comprising an airfoil portion extending radially with reference to the axis of the jet engine, an outer band portion extending continuously from a radially outer end of the airfoil portion circumferentially to one side with reference to the axis of the jet engine, and an inner band portion extending continuously from a radially inner end of the airfoil portion circumferentially to the same side; a support member made of a metal material and comprising a front hook portion to engage with a front portion of the outer band portion located on a gas upstream side and a rear hook portion to engage with a rear portion of the outer band portion located on a gas downstream side; and a turbine case made of a metal material to which the support member is attached.

A turbine according to a second aspect is a turbine according to the first aspect further comprising a seal member interposed between the outer band portion and the support member to create a seal at least between the front portion of the outer band portion and the front hook portion of the support member and between the rear portion of the outer band portion and the rear hook portion of the support member.

A turbine according to a third aspect is a turbine according to the first or the second aspect wherein the support member has grooves in the front hook portion and the rear hook portion, respectively, to allow the front portion and the rear portion of the outer band portion to be circumferentially slid into the grooves in the front and rear hook portions, respectively, thereby allowing the outer band portion to be engaged with the support member.

EXPLANATION OF REFERENCE SIGNS

1 Low-pressure turbine
2 Turbine case
2a Fitting portion
3 Turbine blade
4 Turbine nozzle
10 Turbine nozzle segment
11 Turbine stator vane
12 Hanger (support member)
12a Base portion
12b Front hook portion
12c Rear hook portion
13 Seal member
20 Airfoil portion
21 Outer band portion
22 Inner band portion
30 Hook seal
31 Hanger seal
32 Outer seal
33 Inner seal

The invention claimed is:

1. A turbine provided in a jet engine, comprising: a plurality of turbine stator vanes arranged about an axis of the jet engine to form a turbine nozzle, the turbine stator vanes being made of a ceramic matrix composite and each comprising an airfoil portion extending radially with reference to the axis of the jet engine, an outer band portion extending continuously from a radially outer end of the airfoil portion circumferentially to one side with reference to the axis of the jet engine, and an inner band portion extending continuously from a radially inner end of the airfoil portion circumferentially to the same side, a support member made of a metal material and comprising a front hook portion to engage with a front portion of the outer band portion located on a gas upstream side and a rear hook portion to engage with a rear portion of the outer band portion located on a gas downstream side, a turbine case made of a metal material to which the support member is attached, wherein each of the front hook portion and the rear hook portion has a groove on an inner side thereof winch is open to an axial center of the support member, and wherein an outer side of the support member includes a front rim extending axially upstream and radially outward from the front hook portion.

2. The turbine according to claim 1, further comprising a seal member interposed between the outer band portion and the support member to create a seal at least between the front portion of the outer band portion and the front hook portion of the support member and between the rear portion of the outer band portion and the rear hook portion of the support member.

3. The turbine according to claim 1, wherein the front portion and the rear portion of the outer band portion are allowed to be circumferentially slid into the grooves in the front and rear hook portions, respectively, thereby allowing the outer band portion to be engaged with the support member.

4. The turbine according to claim 2, wherein the front portion and the rear portion of the outer band portion are allowed to be circumferentially slid into the grooves in the front and rear hook portions, respectively, thereby allowing the outer band portion to be engaged with the support member.

5. The turbine according to claim 1, wherein an outer side of the support member includes a rear rim located at the axial center of the support member and extending radially outward, the rear rim including a plurality of through holes, and wherein a distal end of the rear rim engages with a fitting portion of the turbine case, and pins are inserted into the through holes.

* * * * *